United States Patent Office 3,006,885
Patented Oct. 31, 1961

3,006,885
STABILIZED POLYOLEFIN COMPOSITIONS
David M. Dickson, Jr., Wilmington, Del., assignor to Hercules Powder Company, Wilmington, Del., a corporation of Delaware
No Drawing. Filed Aug. 24, 1959, Ser. No. 835,438
8 Claims. (Cl. 260—45.75)

This invention relates to polypropylene compositions and more particularly to the stabilization of polypropylene against degradation by heat and light.

High molecular weight polymers of propylene have recently been developed that show great promise in the plastics industry and the many other applications of thermoplastic materials. However, these polymers, and particularly isotactic polypropylene, when mechanically worked, as for example, in extruding, molding, and other such processes are subject to considerable degradation at the high temperatures required for processing. Degradation also occurs on exposure of the finished article to heat and light as may be encountered in use as, for example, when polypropylene is used for fiber and film, particularly in the fiber and tape used in outdoor furniture, etc.

Now in accordance with this invention it has been found that polypropylene may be stabilized against heat and light degradation by incorporating in the polymer composition a small amount of at least one of the group of polyalkyl - 2(2' - hydroxyphenyl)-2,4,4-trimethylchromans, polyalkyl - 4(2' - hydroxyphenyl) - 2,2,4-trimethylchromans and alkylidene-bis-(alkylphenol)s, in combination with a small amount of a bis(p-alkylphenyl)monosulfide wherein part or all of the phenolic hydrogen atoms have been replaced by nickel. While each of these additives when used alone may increase the stability of polypropylene to heat, the combination of these two stabilizers is synergistic in its effect and increases the stability of the polymer to heat far in excess of the additive effect of the two ingredients and in fact to a most outstanding degree. In fact, such outstanding stability is attained that it makes it possible to use such polymers as isotactic polypropylene for many applications that previously had not been possible, as, for example, in fiber for outdoor furniture, automobile seat covers, film, etc.

The polypropylene which is stabilized in accordance with this invention may be prepared by any of the well-known methods for preparing solid polymers of propylene, as, for example, the processes taught by Belgian Patents 530,617; 535,082; 538,782; 546,846; 549,909; 549,910; U.S. Patents 2,726,231; 2,731,453; 2,824,089; etc. The polypropylene will vary somewhat in its melting point, molecular weight, viscosity, etc., according to variations in the process of manufacture. Particularly outstanding results are obtained when the stabilizers of this invention are incorporated in linear polypropylene that is normally solid and highly crystalline, sometimes referred to as isotactic or stereoregular polypropylene.

The bis-(p-alkylphenol)monosulfide nickel compounds which are used in combination with the 2(or 4)-(2'-hydroxyphenyl)chromans or alkylidene-bis-alkylphenols for the stabilization of polypropylene in accordance with this invention may be the full nickel phenolate where all of the phenolic hydrogens have been replaced with nickel or the so-called "phenol-phenolate" where some, but not all of the phenolic hydrogens have been replaced by nickel. The nickel phenol-phenolates may be prepared by a metathetic reaction between the sodium phenol-phenolate of a bis-(p-alkylphenol)monosulfide and a nickel halide in an anhydrous medium. These nickel phenol-phenolates are believed to have the following structure:

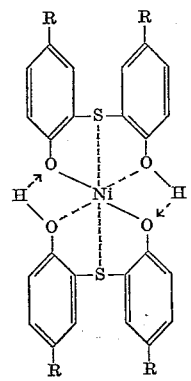

The nickel phenol-phenolates may also be prepared by the reaction of a hydrated nickel salt of a weak acid, e.g. hydrated nickel acetate, and a bis-(p-alkylphenol)-monosulfide in which case the product is believed to have the following structure:

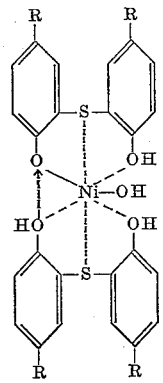

In the above formulae R is an alkyl group of from 2–12 carbon atoms. The dotted lines of the foregoing formulae represent interatomic linkages of the chelate type and simple hydrogen bonding in the case of the free phenolic group. The lines bearing arrows represent interchangeable linkages which suggest the equivalence of the two bis-(p-alkylphenol)monosulfide units in their relationship to the nickel atom.

The full nickel phenolates which may also be used are produced by similar reactions but with correspondingly increased amounts of reactants whereby products of the following general formula are produced.

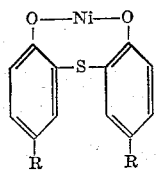

As pointed out above, the nickel compounds are derived from bis-(p-alkylphenol)monosulfides and preferably from o,o'-bis-(p-alkylphenol)monosulfides in which the alkyl group contains from 2–12 carbon atoms. Exemplary of these alkylphenol monosulfides are o,o'-bis-(p-tert-butylphenol)monosulfide, o,o'-bis-(p-tert-amylphenol)monosulfide, o,o'-bis-(p-2-ethylhexylphenol)monosulfide, o,o'-bis-(p-octylphenol)monosulfide, i.e. o,o'-bis-(p-1,1,3,3-tetramethylbutylphenol)monosulfide, o,o'-bis-(p-nonylphenol)monosulfide, o,o'-bis-(p-laurylphenol)-monosulfide.

The stabilizers that are used in accordance with this invention in combination with the nickel compounds of bis-(p-alkylphenol)monosulfides are 2(or 4)-(2'-hydroxyphenyl)-chromans and bisphenols. The 2(or 4)-(2'-hydroxyphenyl)chromans that may be used are those which have one of the following general formulae:

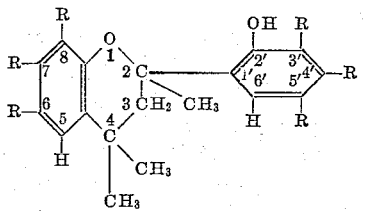

or

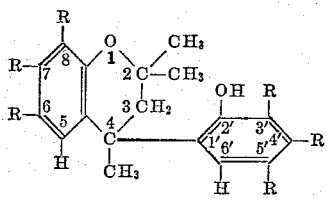

where each R may be hydrogen or alkyl, but at least one R in each of the aromatic rings is alkyl. These compounds may also be named as benzopyrans. Thus the 2-(2'-hydroxyphenyl)chromans may be named as 2,3-dihydro-2(2'-hydroxyphenyl)-1,4-benzopyrans or 3,4-dihydro-2(2'-hydroxyphenyl)-1,2-benzopyrans and the 4-(2'-hydroxyphenyl)chromans may be named as 2,3-dihydro-4(2'-hydroxyphenyl)-1,4-benzopyrans or 3,4-dihydro-4(2'-hydroxyphenyl)-1,2-benzopyrans. The 2(2'-hydroxyphenyl)chromans are also sometimes named as flavans, i.e. 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or 4)-(2'-hydroxyphenyl)chromans that may be used in combination with the nickel phenolates of a bis(p-alkylphenol) monosulfide are 2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)-5',6-di-tert-butyl-2,4,4-trimethylchroman,
4(2'-hydroxyphenyl)-5',6-di-tert-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

The alkylidene-bis-(alkylphenol)s that may be used have one of the following general formulae:

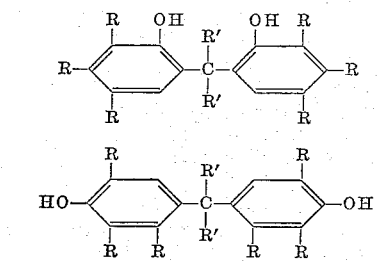

where each R may be hydrogen or alkyl, but at least one R in each of the aromatic rings is alkyl and the alkyl substituent may be any alkyl radical as set forth above for the (2'-hydroxyphenyl)-chroman structures and where each R' may be hydrogen or a lower alkyl as, for example, methyl or ethyl. Exemplary of these alkylidene-bis-(alkylphenol)s that may be used are 2,2'-methylene-bis-(5-isopropylphenol),
2,2'-methylene-bis-(4-methyl-6-isopropylphenol),
2,2'-methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis-(4-methyl-6-tert-butylphenol),
2,2'-isobutylidene-bis-(4-nonylphenol), etc.

These alkylidene-bis-(alkylphenol)s are prepared by any of the well-known procedures of the prior art. Usually, they are prepared by reacting an alkylphenol with formaldehyde, acetaldehyde, acetone, or methyl, ethyl, ketone, etc., in the presence of a strong acid such as hydrochloric acid, etc. In a similar fashion the 2-(2'-hydroxyphenyl)chromans are prepared by reacting an alkylphenol with acetone and the 4-(2'-hydroxyphenyl)-chromans are prepared by reacting an alkylphenol with mesityl oxide. Thus, in many of these reactions a mixture of alkylidene-bis-(alkylphenol)s and (2'-hydroxyphenyl)-chromans is obtained as, for example, when acetone is condensed or reacted with an alkylphenol the reaction product may be a 2-(2'-hydroxyphenyl)chroman or an isopropylidene-bis-(alkylphenol) depending on the reaction conditions or the reaction product may be a mixture of these two types of compounds. In such cases the individual compounds need not be isolated but instead the reaction product may be used with excellent results.

The amount of the two stabilizers incorporated in the polypropylene may be varied from a very small stabilizing amount up to several percent, but outstanding results have been obtained when from about 0.01% to about 5% and preferably from about 0.05% to about 1.0% of the chroman or bisphenol by weight of the polymer is used in combination with from about 0.01% to about 5.0% and preferably from about 0.05% to about 2.0% of the nickel bis-(p-alkylphenol)monosulfide based on the weight of the polymer.

The two stabilizers used in accordance with this invention may be admixed with the polypropylene by any of the usual procedures for incorporating an antioxidant in a solid material. A simple method is to dissolve the antioxidants in a low-boiling solvent such as acetone and, after thoroughly mixing the solution with the polymer in flake or other such form, evaporating the solvent or they may be incorporated by various means of mechanical mixing, or by dry mixing and extruding into molding powder, etc.

The stabilizing combination of this invention may be used in combination with other stabilizers such as ultraviolet light absorbers, antiacids, such as calcium soaps, or other antioxidants. Other materials may also be incorporated in the polymer as, for example, pigments, dyes, fillers, etc.

The following examples will illustrate the tremendous stabilization that is obtained when polypropylene is stabilized in accordance with this invention.

EXAMPLES 1 TO 3

The alkylphenol-acetone condensation product used in this example was prepared by condensing a technical nonylphenol with acetone by saturating the mixture with anhydrous hydrogen chloride at 60° C. and holding at that temperature for 70 hours. The technical nonylphenol used was a mixture of alkylphenols containing approximately 18% octyl, 67% nonyl- and 13% decyl with small amounts of other alkylphenols in which the alkyl radical contained more than 10 carbon atoms, the alkyl substituents being chiefly in the para-position and made up of straight- and branched-chain alkyl groups. The crude reaction mixture was distilled but the individual condensation products were not isolated. This distilled reaction product contained about 23% of the 2(2' - hydroxyphenyl) - 2,4,4 - trimethyl - 5',6 - dinonylchroman and about 34% of the 2,2' - isopropylidene-bis-(4-nonylphenol).

The nickel phenol-phenolate of o,o'-bis-(p-1,1,3,3-tetramethylbutylphenol)monosulfide used in Example 1 was prepared by mixing a 1:1 solution of nickel acetate tetrahydrate in xylene with a 40% solution of o,o'-bis-(p-1,1,3,3-tetramethylbutylphenol)monosulfide in xylene in a molar ratio of 0.5:1 respectively, and heating the mixture at or slightly below the boiling point of acetic acid until the latter was essentially completely removed. The xylene solution was filtered to remove any insolubles that might be present and then was evaporated to remove the xylene. The residual liquor was cooled and the crystalline nickel phenol-phenolate of o,o' - bis - (p - 1,1,3,3 - tetramethylbutylphenol)monosulfide which separated was isolated. It was hard and friable and contained about 6.07% Ni (theoretical is 6.1% Ni).

The nickel phenol-phenolate of o,o'-bis-(p-tert-amylphenol)monosulfide used in Example 2 was prepared as follows: To a solution of sodium (0.46 g.) in anhydrous ethanol (50 g.) was added 3.58 g. of a bis-(p-tert-amylphenol)monosulfide having a melting point of 100–101° C. After solution was complete, a solution of nickel chloride hexahydrate (2.38 g.) in anhydrous ethanol (50 g.) was added. The reaction mixture was stirred 15 min., hexane (100 g.) was added, and the reaction mixture was then heated under reflux for 45 minutes. The sodium chloride that had formed was removed by filtration and washed with a small amount of benzene. The filtrate and benzene washings were combined and the diluents were removed by distillation. The residue was dissolved in hexane and the solution filtered, after which 95% ethanol was added to the filtrate and the hexane was removed by distillation. On cooling to room temperature the nickel phenol-phenolate of the o,o'-bis-(p-tert-amylphenol)monosulfide crystallized in the form of green crystals. This crystalline product was separated and dried at 20° C. in vacuo for 16 hours. It did not melt below 360° C. The analytical results on this product were: theoretical, nickel 14.1%, carbon 63.6%, hydrogen 6.8%; found, nickel (by direct ash) 16.9%, carbon 57.45%, hydrogen 6.86%.

The full nickel phenolate of o,o'-bis-(p-1,1,3,3-tetramethylbutylphenol)monosulfide used in Example 3 was prepared by the same procedure as described above for the nickel phenol-phenolate of o,o'-bis-(p-tert-amylphenol)monosulfide except that the molar ratio of nickel chloride to the bis-(alkylphenol)monosulfide was 0.5:1 instead of 1:1 as in that example. The product that crystallized out and was separated melted at about 270° C. with decomposition. It was found to be a complex of the full nickel phenolate with a molar quantity of ethanol.

The effectiveness of combining the above nonylphenol-acetone condensation reaction product (NA—A—RP) with the above nickel compounds for the stabilization of polypropylene is shown in Table I below, in comparison with each of these stabilizers alone. As may be seen from these data, the nonylphenol-acetone condensation reaction product combined with these nickel compounds exhibits an amazing degree of synergism and results in an outstandingly stabilized polypropylene composition.

In each of the tests a crystalline polypropylene having a melting point of about 165° C. and a reduced specific viscosity of 4.5 (measured on an 0.1% solution in decahydronaphthalene at 135° C.) and containing 0.4% calcium stearate, was thoroughly mixed with a solution of the given amount of antioxidant dissolved in hexane, after which the hexane was evaporated by heating in a vacuum oven at 60° C. for about one hour. The dry mix was extruded into molding powder at 260° C. and the molding powder then pressed into sheets 25 mils thick. Strips cut from these sheets, and 0.5 inch wide, were hung in an oven at 133° C. Other strips, of the same size, were fastened on white cards and placed in the Fade-Ometer. At 24-hour intervals the strips were tested for development of brittleness by bending and by visual observation of degradation, such as granulation. The embrittlement times for each sample are set forth in Table I.

*Table I*

| Ex. | Percent conc. | Percent conc. NP–A–RP | Embrittlement time in hrs. at 133° C. | Fade-ometer life in hrs. |
|---|---|---|---|---|
| 1 | Ni phenol-phenolate of (p-octylphenol)₂S: | | | |
|   | None | 0.5 | 72 | 72 |
|   | 0.5 | | 48 | 275 |
|   | 0.5 | 0.5 | 240 | 360 |
| 2 | Ni phenol-phenolate of (p-amylphenol)₂S: | | | |
|   | None | 0.5 | 72 | 72 |
|   | 0.5 | | 24 | 340 |
|   | 0.5 | 0.5 | 168 | 414 |
| 3 | Full Ni phenolate of (p-octylphenol)₂S: | | | |
|   | None | 0.5 | 72 | 72 |
|   | 0.5 | | 48 | 353 |
|   | 0.5 | 0.5 | 192 | 466 |

What I claim and desire to protect by Letters Patent is:

1. A stabilized polypropylene composition comprising polypropylene, and in intimate admixture therewith a nickel phenolate of a bis-(p-alkylphenol) monosulfide in which the alkyl group contains from 2 to 12 carbon atoms in combination with at least one of the group consisting of 2(2' - hydroxyphenyl) - 2,2,4-trimethyl-polyalkylchromans, 4(2'-hydroxyphenyl) - 2,2,4 - trimethyl-polyalkylchromans, and alkylidene-bis-(alkylphenol)s.

2. A stabilized polypropylene composition comprising polypropylene, and in intimate admixture therewith from about 0.01% to about 5% of a nickel phenolate of a bis-(p-alkylphenol) monosulfide in which the alkyl group contains from 2 to 12 carbon atoms in combination with at least one of the group consisting of 2(2'-hydroxyphenyl)-2,2,4 - trimethyl - polyalkylchromans, 4(2'-hydroxyphenyl)-2,2,4-trimethyl-polyalkylchromans, and alkylidene-bis-(alkylphenol)s.

3. The product of claim 2 wherein the nickel phenolate is a full nickel phenolate of a bis-(p-alkylphenol) monosulfide.

4. The product of claim 2 wherein the nickel phenolate is a nickel phenol-phenolate of a bis-(p-alkylphenol) monosulfide.

5. A stabilized polypropylene composition containing polypropylene and in intimate admixture therewith from about 0.01% to about 5% of a full nickel phenolate of a bis-(p-alkylphenol) monosulfide in which the alkyl group contains from 2 to 12 carbon atoms in combination with from about 0.01% to about 5% of the reaction product of an alkylphenol and acetone.

6. A stabilized polypropylene composition containing polypropylene and in intimate admixture therewith from about 0.01% to about 5% of a nickel-phenol-phenolate of a bis-(p-alkylphenol) monosulfide in which the alkyl group contains from 2 to 12 carbon atoms in combination with from about 0.01% to about 5% of the reaction product of an alkylphenol and acetone.

7. A stabilized polypropylene composition containing polypropylene and in intimate admixture therewith from about 0.01% to about 5% by the weight of the nickel-phenol-phenolate of o,o'-bis-(p-octylphenol) monosulfide in combination with from about 0.01% to about 5% of the reaction product of nonylphenol and acetone.

8. A stabilized polypropylene composition containing polypropylene and in intimate admixture therewith from about 0.01% to about 5% by the weight of the nickel-phenol-phenolate of o,o'-bis-(p-amylphenol) monosulfide in combination with from about 0.01% to about 5% of the reaction product of nonylphenol and acetone.

References Cited in the file of this patent
UNITED STATES PATENTS

| | | |
|---|---|---|
| 2,340,938 | Daly | Feb. 8, 1944 |
| 2,380,299 | Evans et al. | July 10, 1945 |
| 2,917,550 | Dietzler | Dec. 15, 1959 |